United States Patent
Chan et al.

(10) Patent No.: US 10,499,276 B2
(45) Date of Patent: Dec. 3, 2019

(54) METHOD AND SYSTEM FOR END-TO-END ADMISSION AND CONGESTION CONTROL BASED ON NETWORK SLICING

(71) Applicant: Verizon Patent and Licensing Inc., Arlington, VA (US)

(72) Inventors: Yee Sin Chan, San Jose, CA (US); Jin Yang, Orinda, CA (US); Ye Huang, San Ramon, CA (US); Zheng Zhao, Plainsboro, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/913,024

(22) Filed: Mar. 6, 2018

(65) Prior Publication Data

US 2019/0281494 A1   Sep. 12, 2019

(51) Int. Cl.
*H04W 24/08* (2009.01)
*H04W 28/02* (2009.01)
*H04W 72/10* (2009.01)

(52) U.S. Cl.
CPC ....... *H04W 28/0289* (2013.01); *H04W 24/08* (2013.01); *H04W 72/10* (2013.01)

(58) Field of Classification Search
CPC . H04W 48/08; H04W 48/16; H04W 74/0833; H04W 76/27; H04W 48/02; H04W 16/02; H04W 24/02; H04W 24/08; H04W 28/0289; H04W 76/021; H04W 48/06; H04L 41/5054; H04L 41/5051; H04L 67/303; H04L 47/2408; H04L 47/805; G06F 3/067; G06F 3/0619

USPC ......................................... 370/230, 252, 329
See application file for complete search history.

(56) References Cited

U.S. PATENT DOCUMENTS

| | | | | |
|---|---|---|---|---|
| 8,873,387 B2* | 10/2014 | Chan | ...................... | H04W 4/70 370/230 |
| 9,258,733 B2* | 2/2016 | Yang | ................. | H04W 72/0413 |
| 9,888,455 B1* | 2/2018 | Laslo-Amit | ............. | B61L 25/02 |
| 9,949,271 B2* | 4/2018 | Hsu | ........................ | H04L 65/80 |
| 9,967,801 B2* | 5/2018 | Byun | ...................... | H04W 8/06 |
| 10,038,639 B2* | 7/2018 | Francini | .................. | H04L 47/11 |
| 10,070,344 B1* | 9/2018 | Dowlatkhah | ......... | H04W 28/16 |
| 10,104,640 B2* | 10/2018 | Laslo-Amit | ............. | B61L 25/02 |
| 10,120,669 B2* | 11/2018 | Karagiannis | ............. | G06F 8/60 |
| 10,129,108 B2* | 11/2018 | Vrzic | .................... | H04W 24/08 |
| 10,268,474 B2* | 4/2019 | Stammers | ............... | H04W 4/80 |
| 10,313,997 B2* | 6/2019 | Singh | .................... | H04W 60/00 |
| 10,321,371 B2* | 6/2019 | Zhang | .................... | H04W 36/22 |
| 10,382,903 B2* | 8/2019 | Shaw | ...................... | H04W 4/08 |
| 2015/0055494 A1* | 2/2015 | Zhou | ................. | H04W 28/0247 370/252 |
| 2018/0123878 A1* | 5/2018 | Li | .......................... | H04L 41/04 |
| 2018/0123961 A1* | 5/2018 | Farmanbar | .......... | H04L 41/0893 |

(Continued)

*Primary Examiner* — Man U Phan

(57) ABSTRACT

A method, a device, and a non-transitory storage medium are described in which a network slice-based admission and congestion control service is provided. The congestion control service monitors for congestion in a network slice. When congestion is detected, the congestion control service may adjust an allotment of a resource of a network device or the resource of the network slice from end-to-end. When neither of these adjustments can be made, the congestion control service may use a network slice-based access control barring.

20 Claims, 14 Drawing Sheets

(56) References Cited

U.S. PATENT DOCUMENTS

2018/0324663 A1\* 11/2018 Park .................. H04W 36/08
2018/0376407 A1\* 12/2018 Myhre ................ H04W 76/27

\* cited by examiner

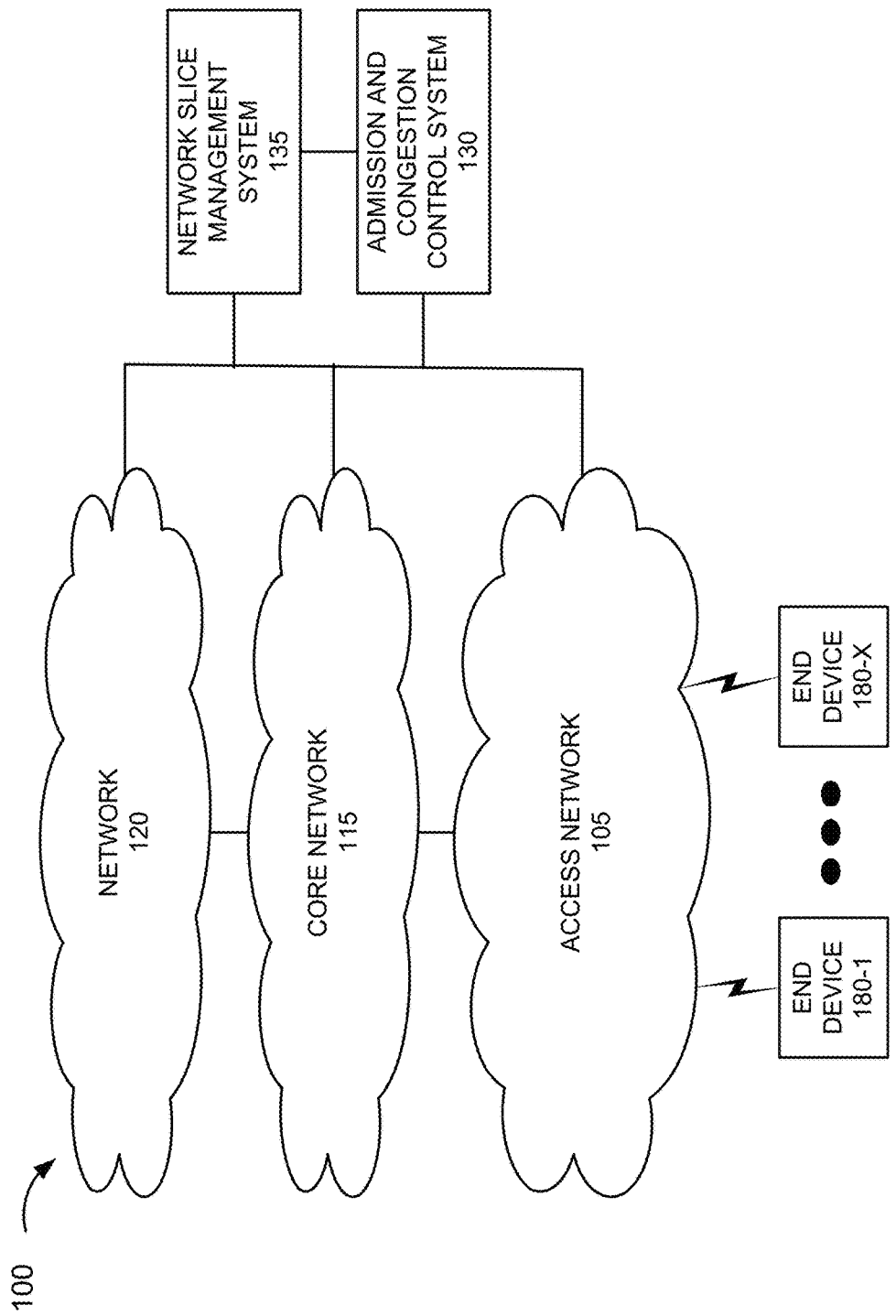

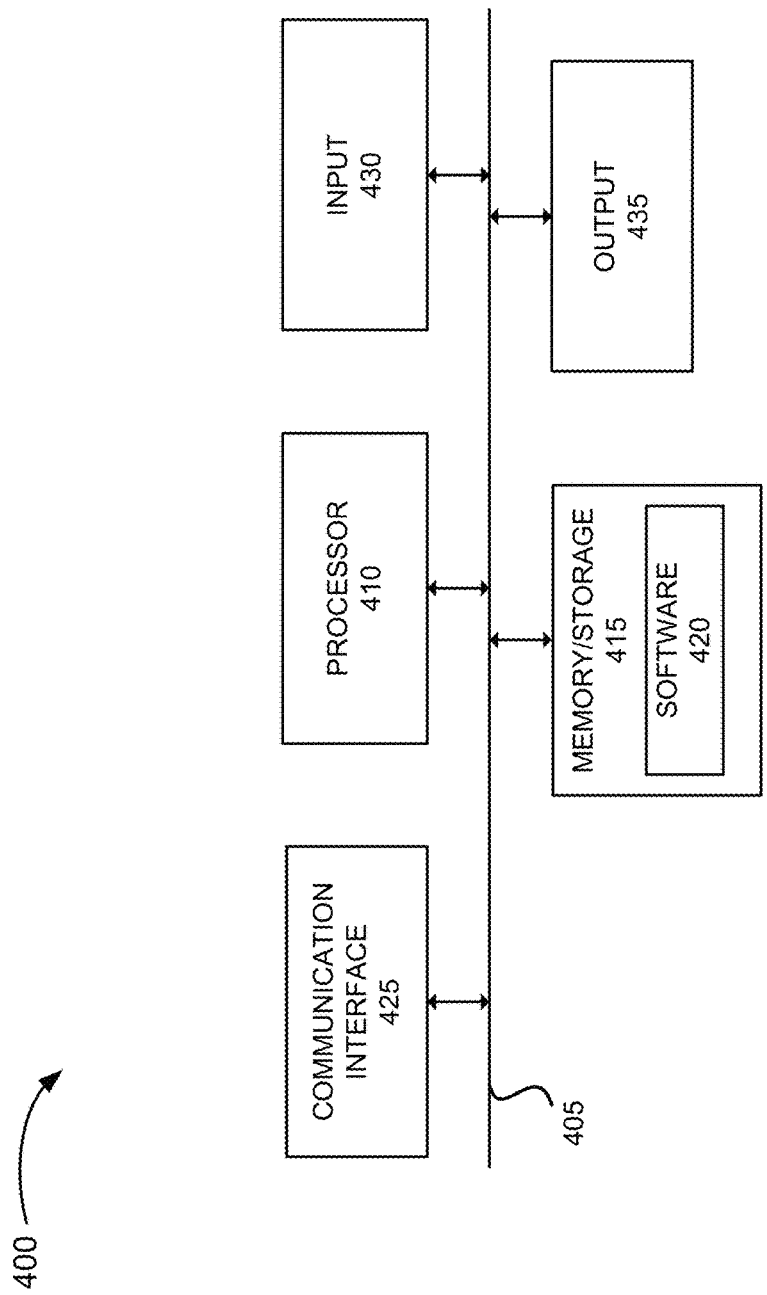

METHOD AND SYSTEM FOR END-TO-END ADMISSION AND CONGESTION CONTROL BASED ON NETWORK SLICING

BACKGROUND

The development and design of future wireless networks (e.g., Fifth Generation (5G) networks, etc.) is currently underway by various organizations, service providers, and so forth. For example, the development and design of future wireless networks may be based on cloud technologies, software defined networking (SDN), and network function virtualization (NFV).

BRIEF DESCRIPTION OF THE DRAWINGS

FIG. 1 is a diagram illustrating an exemplary environment in which an exemplary embodiment of an end-to-end admission and congestion control service may be implemented;

FIG. 4 is a diagram illustrating exemplary components of a device that may correspond to one or more of the devices illustrated and described herein;

DETAILED DESCRIPTION OF PREFERRED EMBODIMENTS

Figure 2A:
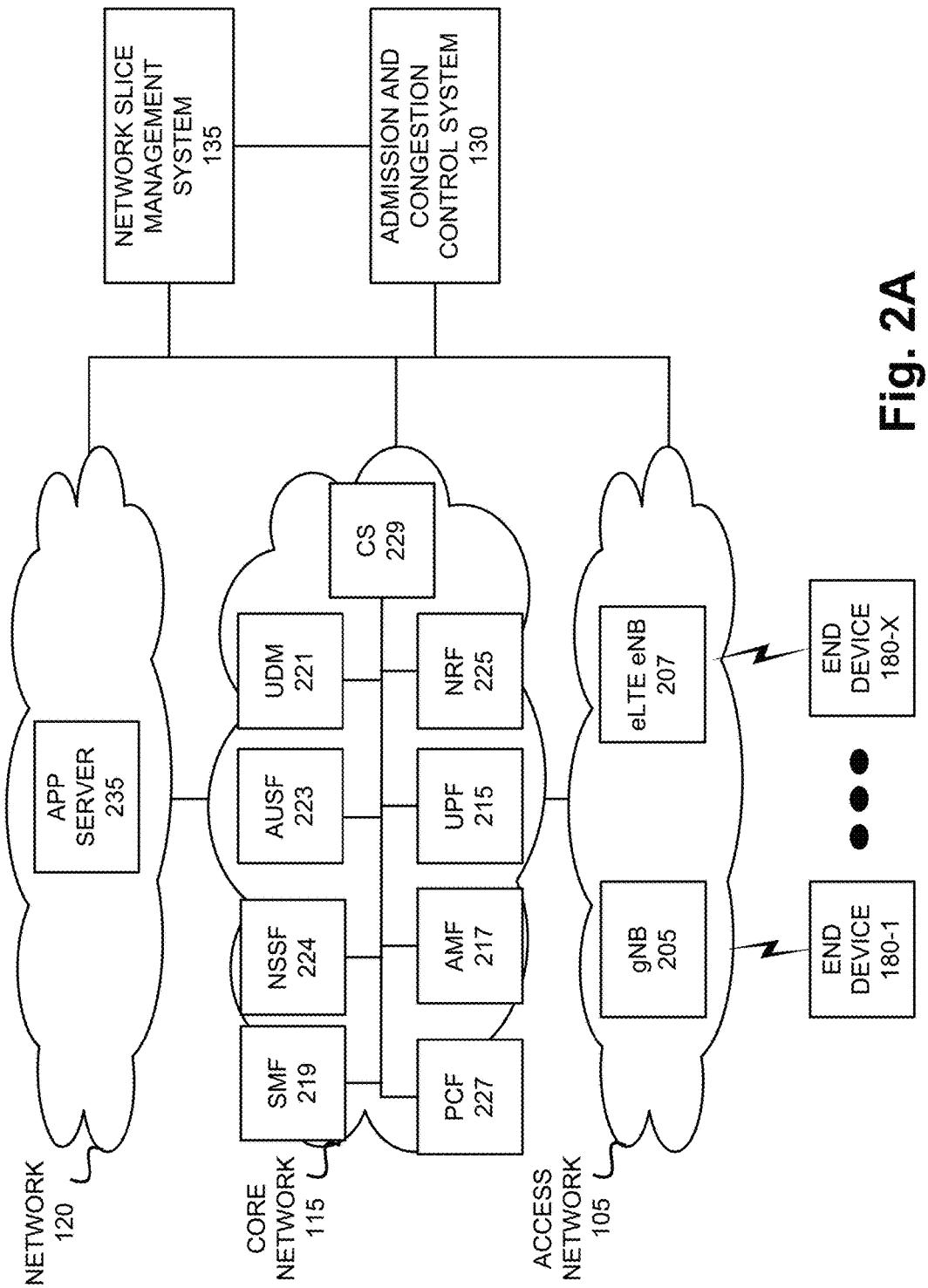
FIGS. 2A-2G are diagrams illustrating an exemplary process of an exemplary embodiment of the end-to-end admission and congestion control service.

The following detailed description refers to the accompanying drawings. The same reference numbers in different drawings may identify the same or similar elements. Also, the following detailed description does not limit the invention.

A network should support various use cases, meet various performance metrics, allow for scalability and flexibility, and may be implemented based on SDN and NFV in an integrated fashion. Ubiquitous automation, network slicing, closed loop service assurance, self-healing, and other network attributes and/or services may be integral aspects of the network. For example, network slicing services of the network may create and dynamically manage functionally isolated networks (e.g., virtualized, logical, physical, etc.). A network may include a radio access network (RAN), a core network, a service or application layer network, a cloud network, and so forth. The network may also include networks of diverse technologies (e.g., Fourth Generation (4G) wireless, Fifth Generation (5G) wireless, optical, Long Term Evolution (LTE) core network, etc.). Network slicing may be implemented based on cloud technologies, SDN, NFV, network orchestration, OpenFlow, and/or other technologies. Networks may be sliced in many ways. A network slice may be considered a partition or segment of a larger network infrastructure. For example, network slices may be logical networks or virtual networks that may operate on a shared physical network infrastructure. The network slice may be a logical/virtual end-to-end network (e.g., RAN to core network, RAN to application/service layer via a transport network and a core network, etc.). The network slice may be configured to meet specific applications, services, end devices demands, and/or other criteria. For example, the network slice may be expected to meet certain reliability, latency, bandwidth, and/or other quality-of-service (QoS) requirement. Network slices may be isolated from each other across planes, such as the control and user planes.

The provisioning of a network to satisfy network slicing requirements can be challenging. For example, network resources must be allocated to support the network slice, and the network slice has to be managed during its use. Also, there are resource management and congestion control issues that need to be addressed. Currently, there is no mechanism that manages end-to-end admission and congestion control for network slices of next generation networks. However, a network that does not include mechanisms to manage such issues will suffer from waste of various network resources, such as physical network resources (e.g., processor, memory, storage, communication interface, communication link, etc.) from both the network-side and the end device-side, logical network resources, virtual network resources, as well as other degradations that inherently arise therefrom (e.g., congestion, quality of service (QoS), access barring, etc.).

According to exemplary embodiments, an admission and congestion control system provides an admission and congestion control service, as described. According to an exemplary embodiment, the admission and congestion control system detects congestion of a network device of a network slice. The admission and congestion control system may determine whether a network resource of the network device can be increased. The network resource may be a physical resource (e.g., storage, transport, computational, etc.), a logical resource (e.g., a partition of a physical resource dedicated to a network device or shared between a set of network devices), a virtual resource (e.g., an abstraction of a physical or a logical resource), or some combination thereof. If so, the network resource of the network device is increased. If not, the admission and congestion control system may determine whether the end-to-end resources of the network slice can be increased. If so, the end-to-end resources of the network slice are increased. If not, the admission and congestion control system may invoke an access control barring procedure, which pertains to the network slice. According to an exemplary embodiment, the access control barring procedure may bar a percentage of end devices from access to the network slice for a particular time period. The percentage of end devices, the length of time for barring, and/or the number of application/services hosted by the network slice may be increased until the congestion is relieved.

As a result, the admission and congestion control service may improve network resource utilization in a network. For example, the admission and congestion control service may improve the use of various network resources (e.g., physical, logical, virtual) in relation to network devices of an access network, a core network, and/or other type of network when a network slice or a portion of a network slice is congested. Additionally, the admission and congestion control service may improve resource utilization at an end device. For example, the admission and congestion control service may improve the use of various resources (e.g., memory, processor, communication interface, radio resources, etc.) in relation to the end device when a network slice or a portion of a network slice is congested. The admission and congestion control service may minimize or prevent measures to be executed by a network and/or an end device (e.g., a cell reselection procedure, invoke a handover procedure, access barring, etc.) when a portion of a network slice or a network slice is in a congested state.

FIG. 1 is a diagram illustrating an exemplary environment 100 in which an exemplary embodiment of the admission and congestion control service may be implemented. As illustrated, environment 100 includes an access network 105, a core network 115, a network 120, an admission and congestion control system 130, and a network slice management system 135. Environment 100 also includes end devices 180-1 through 180-X (also referred to collectively as end devices 180 and, individually or generally as end device 180).

According to other embodiments, environment 100 may include additional devices, fewer devices, and/or different types of devices than those illustrated and described herein. For example, a function of a single network device may be implemented by multiple devices, and/or functions of multiple network devices may be implemented by a single network device. In this regard, the number, type, and/or arrangement of network devices (also known as network elements or network functions) in environment 100 are exemplary. A network device, a network element, or a network function (referred to herein simply as a network device) may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, a cloud device, a virtualized function, etc). According to other exemplary embodiments, environment 100 may include additional networks, fewer networks, and/or different networks than those illustrated and described herein.

Environment 100 includes communication links. Environment 100 may be implemented to include wired, optical, and/or wireless communication links among networks, network devices, and end devices, as illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

Access network 105 includes one or multiple networks of one or multiple types and technologies. According to an exemplary embodiment, access network 105 is implemented by a technology that supports network slicing. According to an exemplary implementation, access network 105 may include a 4G radio access network (RAN) (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), and a future or next generation RAN (e.g., a 5G-access network (5G-AN) or a 5G-RAN (referred to herein as simply a 5G-RAN)). According to other exemplary implementations, access network 105 may include other types of RANs (e.g., a Third Generation (3G) RAN, a 3.5G RAN, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, and/or an Evolution Data Optimized (EV-DO) RAN).

Access network 105 may communicate with other types of access networks, such as, for example, a WiFi network, a Worldwide Interoperability for Microwave Access (Wi-MAX) network, a local area network (LAN), a cloud RAN, a wired network (e.g., optical, cable, coaxial, copper, etc.), or other type of network that provides access to or can be used as an on-ramp to access network 105, core network 115 and/or network 120.

Depending on the implementation, access network 105 may include various types of network devices that are not illustrated in FIG. 1. For example, access network 105 may include an evolved Node B (eNB), an eLTE eNB, a next generation Node B (gNB), a base station (BS), a base transceiver station (BTS), a Node B, a remote radio head (RRH), an RRH and a baseband unit (BBU), a BBU, a radio network controller (RNC), a wireless node (e.g., a small cell node (e.g., a picocell device, a femtocell device, a microcell device, a home eNB, a repeater, etc.)), or other type of network device.

According to various exemplary embodiments, access network 105 may be implemented according to various architectures of wireless service, such as, for example, macrocell, microcell, femtocell, picocell, metrocell, non-cell, or other configuration. Additionally, according to various exemplary embodiments, access network 105 may be implemented according to various wireless technologies (e.g., radio access technology (RAT), multi-RAT dual-connectivity (e.g., master cell group (MCG), secondary cell group (SCG), split bearer, etc.)), wireless standards, wireless frequencies/bands, and so forth.

Core network 115 includes one or multiple networks of one or multiple types and technologies. According to an exemplary embodiment, core network 115 is implemented by a technology that supports network slicing. According to an exemplary implementation, core network 115 includes a complementary network pertaining to the one or multiple RANs described. For example, core network 115 may include the core part of an LTE network, an LTE-A network, and/or a next generation core network (NGC).

Depending on the implementation, core network 115 may include various network devices, such as a gateway, a mobility management entity (MME), a user plane function (UPF), a packet data network gateway (PGW), a serving gateway (SGW), a session management function (SMF), as well other network devices pertaining to various network-related functions, such as billing, security, authentication and authorization, network polices, subscriber profiles, and/or other network devices that facilitate the operation of core network 115.

Network 120 includes one or multiple networks of one or multiple types and technologies. According to an exemplary embodiment, network 120 is implemented by a technology that supports network slicing. According to an exemplary embodiment, network 120 provides an application and/or a service to end device 180. For example, network 120 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, or other type of network that hosts an end device application or service. For example, the end device application/service network may provide various applications/services pertaining to broadband access in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

Depending on the implementation, network 120 may include various network devices that provide various applications, services, or other type of end device assets, such as servers (e.g., web, application, cloud, etc.), mass storage devices, data center devices, and/or other types of network devices pertaining to various network-related functions.

Admission and congestion control system 130 includes logic that provides the admission and congestion control service, as described herein. According to an exemplary embodiment, admission and congestion control system 130 detects when a network resource of access network 105, core network 115, and network 120 is congested. According to an exemplary implementation, admission and congestion control system 130 detects congestion based on state information received from the network resource. For example, a gNB, a UPF, an SGW, a PGW, or some other network device of a network slice may monitor and generate state information pertaining to various network resources (e.g., physical, logical, virtual). The gNB, the UPF, the SGW, or the PGW may transmit the state information to admission and congestion control system 130. Admission and congestion control system 130 includes logic that analyzes the state information and determines whether a congested state is present. For example, admission and congestion control system 130 may store congestion parameters and values that are used for comparison. Based on the comparison, admission and congestion control system 130 may detect when there is no congestion, a low congested state, a medium congested state, a high congested state, or some other nomenclature to indicate a degree or a level of congestion. According to other exemplary implementations, the network device of a network slice may monitor and generate congestion information pertaining to various network resources. For example, the congestion information may include parameters and values indicating a level of congestion with respect to a network resource.

According to various exemplary embodiments, admission and congestion control system 130 includes logic that invokes a remedial mechanism that addresses congestion when admission and congestion control system 130 determines that there is congestion. According to an exemplary embodiment, admission and congestion control system 130 determines whether an allocation of a network resource can be increased. If so, the network resource is increased. For example, a network resource of the gNB, the UPF, the SGW, or the PGW may be increased.

If the network resource cannot be increased, according to an exemplary embodiment, admission and congestion control system 130 determines whether the end-to-end network resources of another network slice can be reduced in order to increase the network resource of the congested network slice. For example, the other network slice may be identified and selected when it is under-utilized (e.g., from a resource utilization perspective). Additionally, or alternatively, the other network slice may be identified and selected based on the type of application/service supported and/or priority classes associated with the network slice and the other network slice. For example, admission and congestion control system 130 may select the other network slice from which to use network resources, when the other network slice is of a lower priority class relative to the congested network slice. For example, the network slice may have a priority class of "high" that supports real-time applications/services, and the other network slice may have a priority class of "low" that supports non-real time applications/services. According to such an example, admission and congestion control system 130 may reduce the allocation of a network resource associated with the other network slice and increase the allocation of a network resource associated with the network slice. According to another exemplary embodiment, there may be reserved or unused network resources available to increase the allocation of the congested network slice without the reduction of another network slice (or portion thereof). If the end-to-end network resources of another network slice can be reduced and/or unused resources are available, then the end-to-end resource of the congested network slice is increased.

If the end-to-end network resources of the other network slice cannot be reduced, according to an exemplary embodiment, admission and congestion control system 130 invokes a slice-based access control barring procedure to be performed by a network device of the congested network slice. For example, an eNB, a gNB, or other network device of access network 105 may perform the slice-based access control barring procedure relative to end device 180, as described herein.

Network slice management system 135 includes logic that modifies a configuration of a network slice. According to an exemplary embodiment, the modification may occur while the network slice is in use. According to various exemplary embodiments, network slice management system 135 may modify the capacity of a network device of a network slice (e.g., increase or decrease the available network resources); modify the configuration of a network device of the network slice; add, replace, or remove a network device of a network slice; and add, replace, or remove a network slice. Network slice management system 135 may modify a network slice based on communication with admission and congestion control system 130.

End device 180 includes a device that has computational and wireless communication capabilities. End device 180 may be implemented as a mobile device, a portable device, or a stationary device. End device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or some other type of wireless end node. By way of further example, end device 180 may be implemented as a smartphone, a personal digital assistant, a tablet, a netbook, a phablet, a wearable device, a set top box, an infotainment system in a vehicle, a vehicle support system, a smart television, a game system, a music playing system, or some other type of wireless user device. According to various exemplary embodiments, end device 180 may be configured to execute various types of software (e.g., applications, programs, etc.). The number and the types of software may vary among end devices 180. End device 180 may support one or multiple radio access technologies (RATs) (e.g., 4G, 5G, etc.), one or multiple frequency bands, and so forth. Additionally, end device 180 may include one or multiple communication interfaces that provide one or multiple (e.g., simultaneous) connections via the same or different RATs, frequency bands, and so forth.

FIGS. 2A-2G are diagrams illustrating an exemplary process of the admission and congestion control service. Referring to FIG. 2A, assume that a network slice has been configured and is in use by end devices 180. According to this example, the network slice includes a gNB 205 and an eLTE eNB of access network 105. Additionally, for example, the network slice includes a user plane function (UPF) 215, a core access and mobility management function (AMF) 217, a session management function (SMF) 219, a unified data management (UDM) device 221, an authentication server function (AUSF) 223, a network slice selection function (NSSF) 224, a network repository function (NRF) 225, a policy control function (PCF) 227, and a charging system (CS) 229 of core network 115. Further, for example, the network slice includes an application server 235 of network 120. According to other exemplary scenarios, the network slice may include additional, fewer, and/or different networks and/or additional fewer, and/or different network devices than those illustrated and described herein.

According to various exemplary embodiments, gNB 205, eLTE eNB 207, UPF 215, AMF 217, SMF 219, UDM 221, AUSF 223, NSSF 224, NRF 225, PCF 227, and CS 229 may operate and provide a network function according to a standard (e.g., Third Generation Partnership Project (3GPP), International Telecommunication Union (ITU), etc.) and/or a proprietary technology. According to an exemplary embodiment, one or multiple network devices may include logic that provides an admission and congestion control service, as described herein. Additionally, according to an exemplary embodiment, such network device may include a communication interface that provides for the transmission and/or reception of data that supports the admission and congestion control service, as described herein.

Figure 2B:
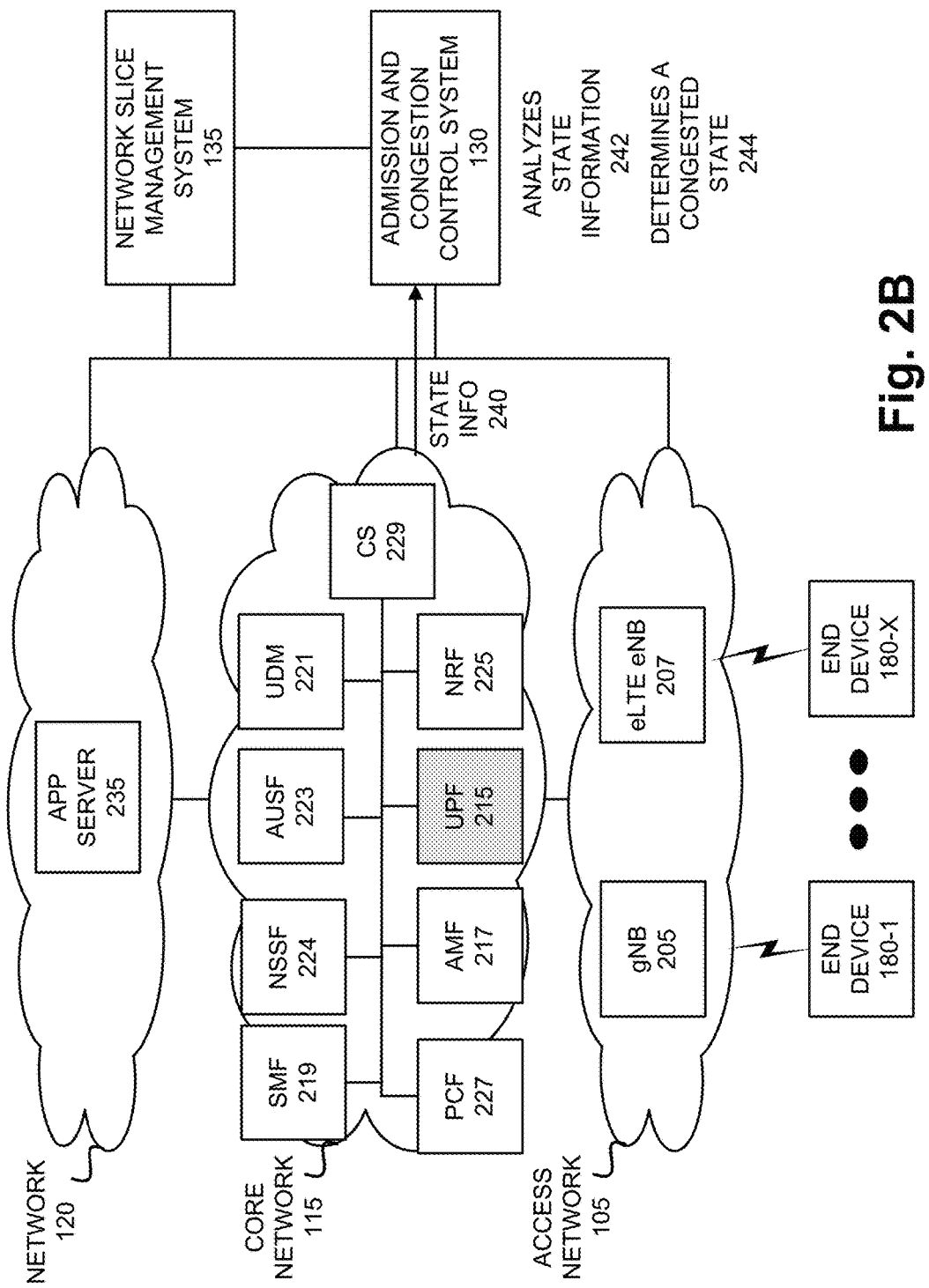

Referring to FIG. 2B, assume that UPF 215 monitors its resource utilization pertaining to the network slice. Based on the monitoring, UPF 215 generates state information that includes parameters and values pertaining to one or multiple network resources (e.g., physical, logical, virtual). UPF 215 transmits the state information 240 to admission and congestion control system 130. In response to receiving the state information, admission and congestion control system 130 analyzes the state information 242. For example, admission and congestion control system 130 may compare the parameters and values to congestion parameters and values. Based on the comparison, admission and congestion control system 130 determines that UPF 215 of a network slice is in a congested state 244. For example, admission and congestion control system 130 may identify one or multiple network resources that are over-utilized (e.g., in a congested state) based on the comparison.

Figure 2C:
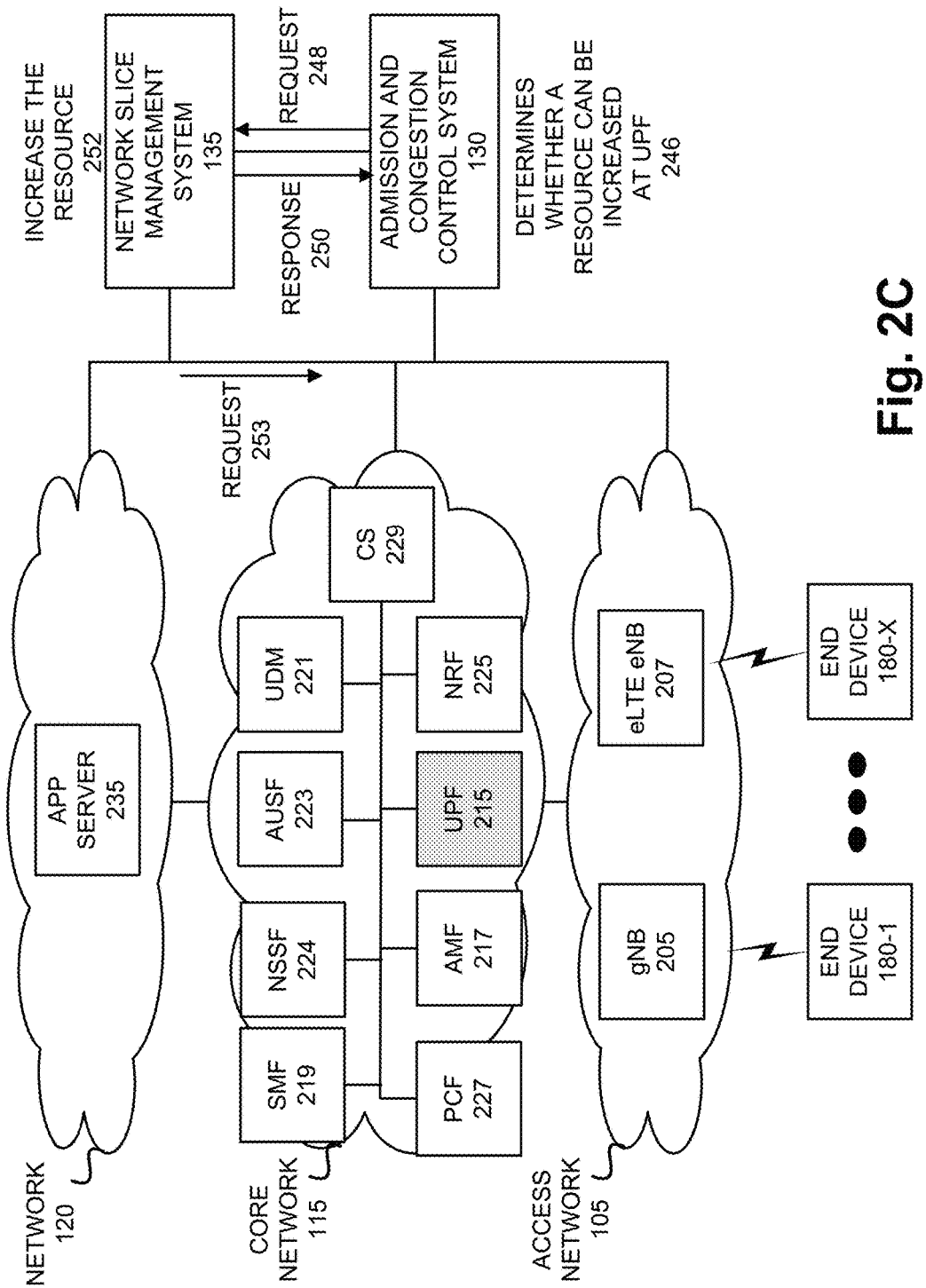

Referring to FIG. 2C, in response to determining that UPF 215 is in a congested state, admission and congestion control system 130 determines whether a network resource can be increased at UPF 246. For example, admission and congestion control system 130 may generate and transmit a request 248 to network slice management system 135. According to various exemplary implementations, request 248 may include various types of information, such as, for example, an identifier of the network slice, an identifier of UPF 215, and an indicator of the type of network resource to be increased. The request may include other types of information, such as for example, an indicator of the amount of the increase for the network resource, the level of congestion, and/or the state information.

In response to receiving the request, network slice management system 135 may determine whether the network resource of UPF 215 can be increased. If network slice management system 135 determines that the network resource can be increased, network slice management system 135 increases the network resource 252. For example, network slice management system 135 may generate and transmit a request 253, which indicates to increase the network resource of UPF 215 in relation to the network slice, to a network device of core network 115 (not illustrated). For example, the network device of the core network may be implemented as a service orchestrator, a slice orchestrator, or other network device that configures the network resources of a network device of a network slice. Request 253 may include other types of information, such as for example, the network resource to be increased (e.g., storage, bandwidth, etc.), the amount of the increase, an identifier of the network device, and/or an identifier of the network slice. Additionally, as illustrated, network slice management system 135 generates and transmits a response 250 to admission and congestion control system 130. For example, the response may indicate the network resource has been increased. According to such an exemplary scenario, admission and congestion control system 130 may wait for additional state information or congestion information from UPF 215 and determine whether further remedial measures are to be taken.

However, if network slice management system 135 determines that the network resource cannot be increased, response 250 may indicate that the network resource has not been increased. With this assumption in mind, referring to FIG. 2D, in response to receiving response 250, which indicates that the network resource cannot be increased, admission and congestion control system 130 determines whether a network resource of the network slice, from end-to-end, can be adjusted 255. For example, admission and congestion control system 130 may generate and transmit a request 257 to network slice management system 135. According to various exemplary implementations, request 257 may include various types of information, such as, for example, an identifier of the network slice and an indicator of the type of resource to be increased. Request 257 may include other types of information, such as for example, the amount of the increase, the level of congestion, and/or the state information.

In response to receiving request 257, network slice management system 135 may determine whether the network resource of the network slice can be increased. As previously described, the adjustment of the network resource of the congested network slice may be end-to-end. Network slice management system 135 may include logic that selects another network slice (or a portion thereof) to reduce the allocation of a network resource and, in turn, increase the network resource of the congested network slice. Network slice management system 135 may also include logic that selects an unused resource (e.g., a reserve) in order to increase the network resource of the network slice.

Figure 3A:
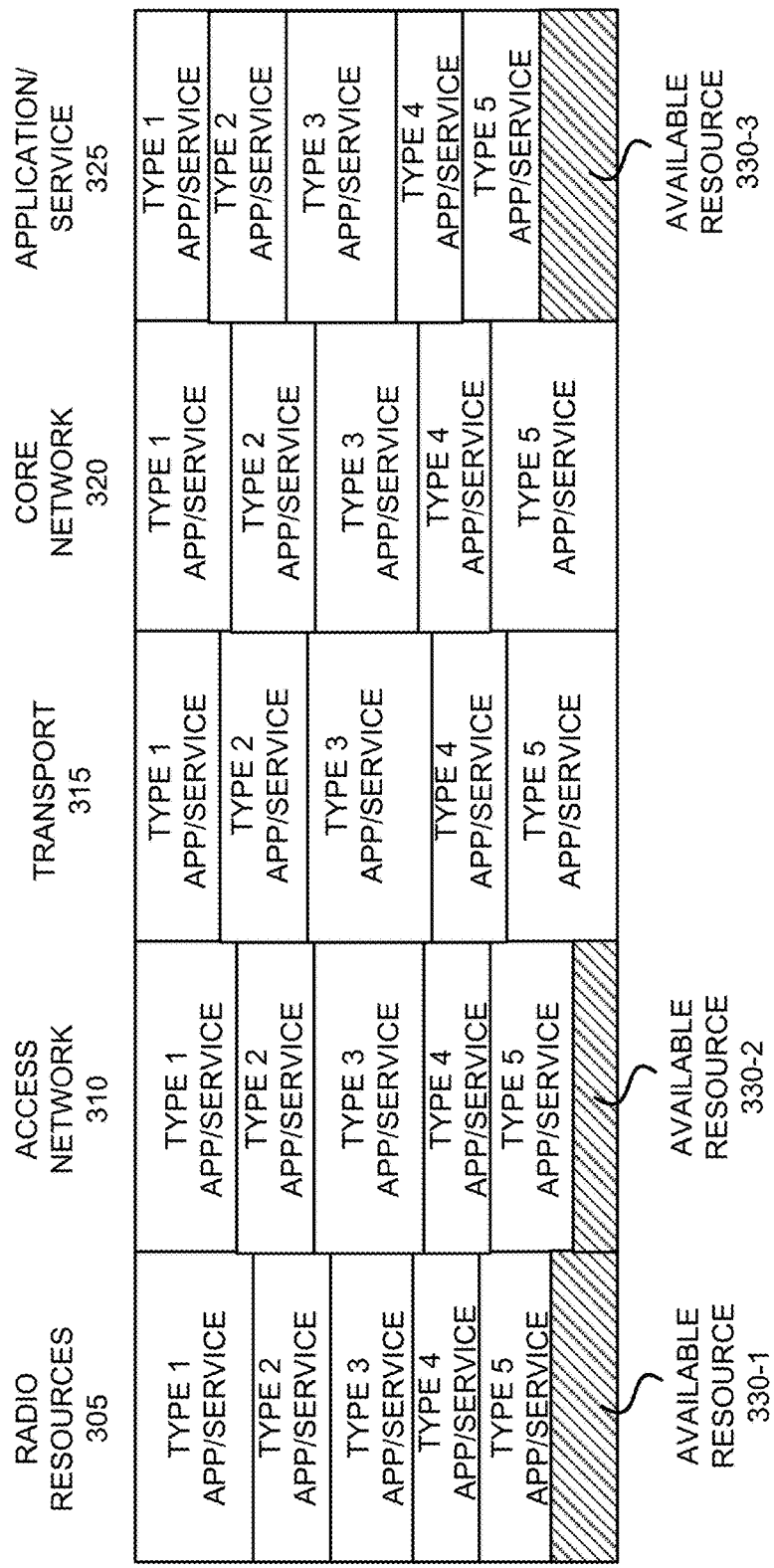
FIG. 3A is a diagram illustrating an exemplary division of end-to-end resources of network slices.

FIG. 3A is a diagram illustrating an exemplary division of end-to-end resources of network slices. As illustrated, the division of network resources of a network slice may include a radio resources portion 305, an access network portion 310, a transport portion 315, a core network portion 320, and an application/service portion 325. According to other exemplary implementations, the division of network resources of the network slice may be different.

Radio resources portion 305 may indicate air interface resources (e.g., radio resources) associated with the communication link between the network devices of access network 105 and end devices 180. Access network portion 310 may indicate network resources associated with network devices/communication links of access network 105. Transport portion 315 may indicate fronthaul and backhaul network resources between access network 105 and core network 115. Core network portion 320 may indicate network resources of core network 320. Application/service portion 325 may indicate network resources of network 120. As further illustrated, for example, the division of end-to-end resources of network slices may include available resources 330-1 through 330-3 (referred to collectively as available resources 330, and generally or individually as available resource 330). Available resource 330 may be unused or reserve network resources. According to an exemplary implementation, available resource 330 may be used to increase end-to-end resources of a network slice.

As further illustrated, according to an exemplary implementation, various types of application and/or services may be supported by the network slices. For the sake of description only, the various types of application and/or services are categorized as types 1-5. For example, an application/service may be categorized as delay-tolerant, machine-type communication (MTC), real-time, non-real time, non-guaranteed, mission critical, and so forth. According to other exemplary implementations, the number and the nomenclature of the application/service types may be different. Additionally, a category of an application/service may be assigned a priority class. For example, background or unattended applications/services may be assigned a low priority, real-time applications/services may be assigned a high priority, and mission critical applications/services may be assigned an urgent priority. A network slice may support one or multiple types of applications/services.

Figure 2D:
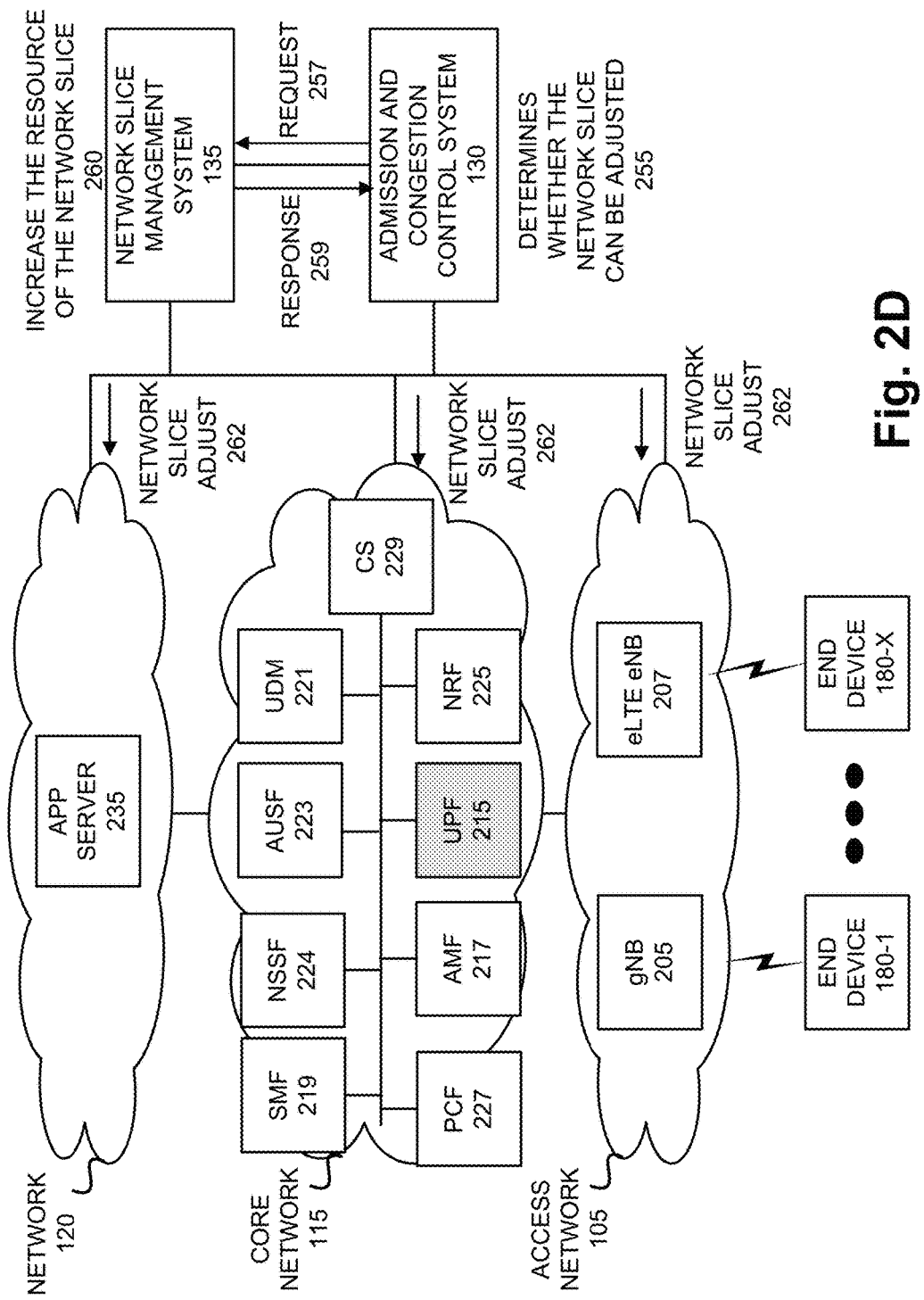
Figure 2E:
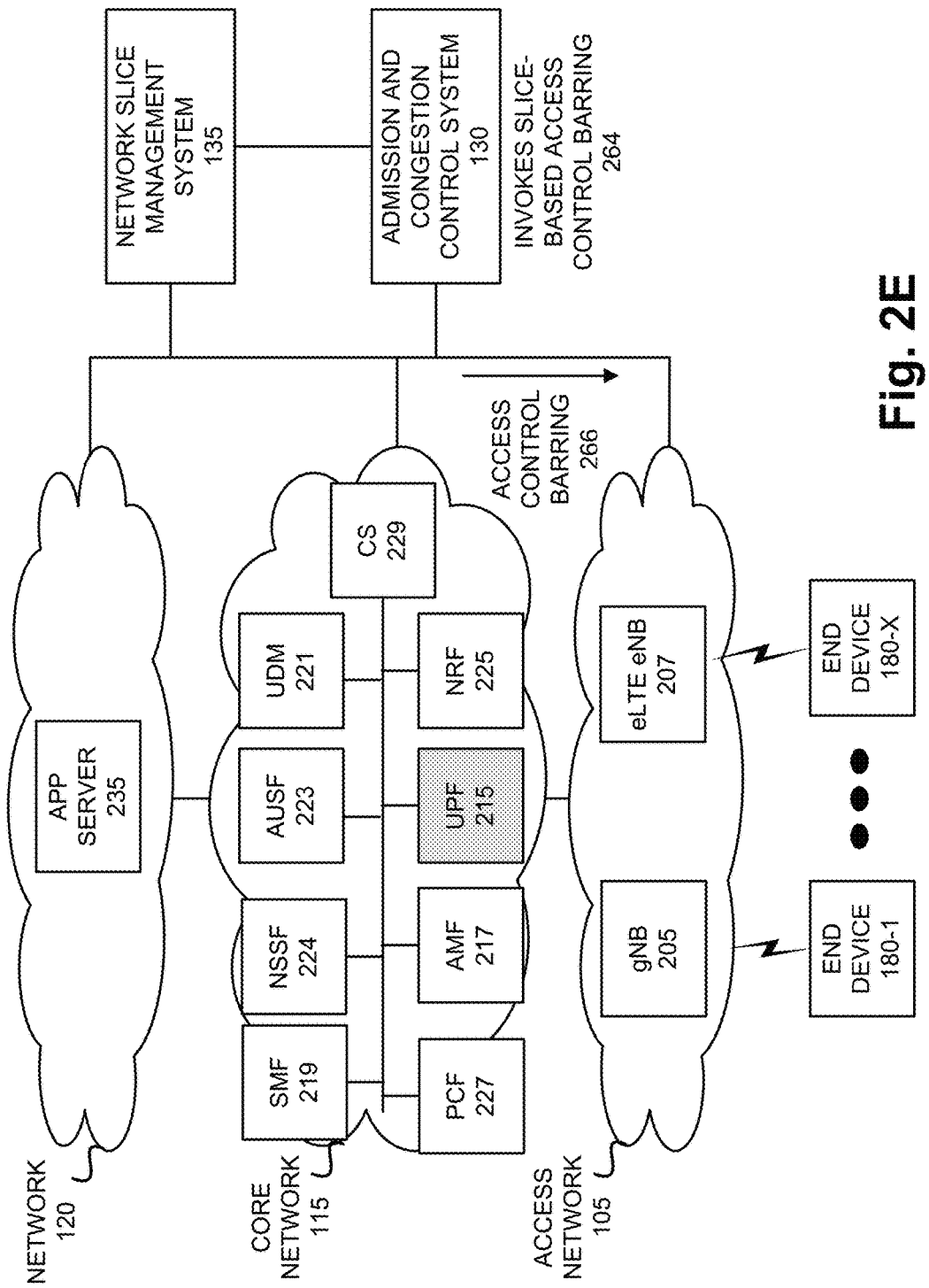
Figure 3B:
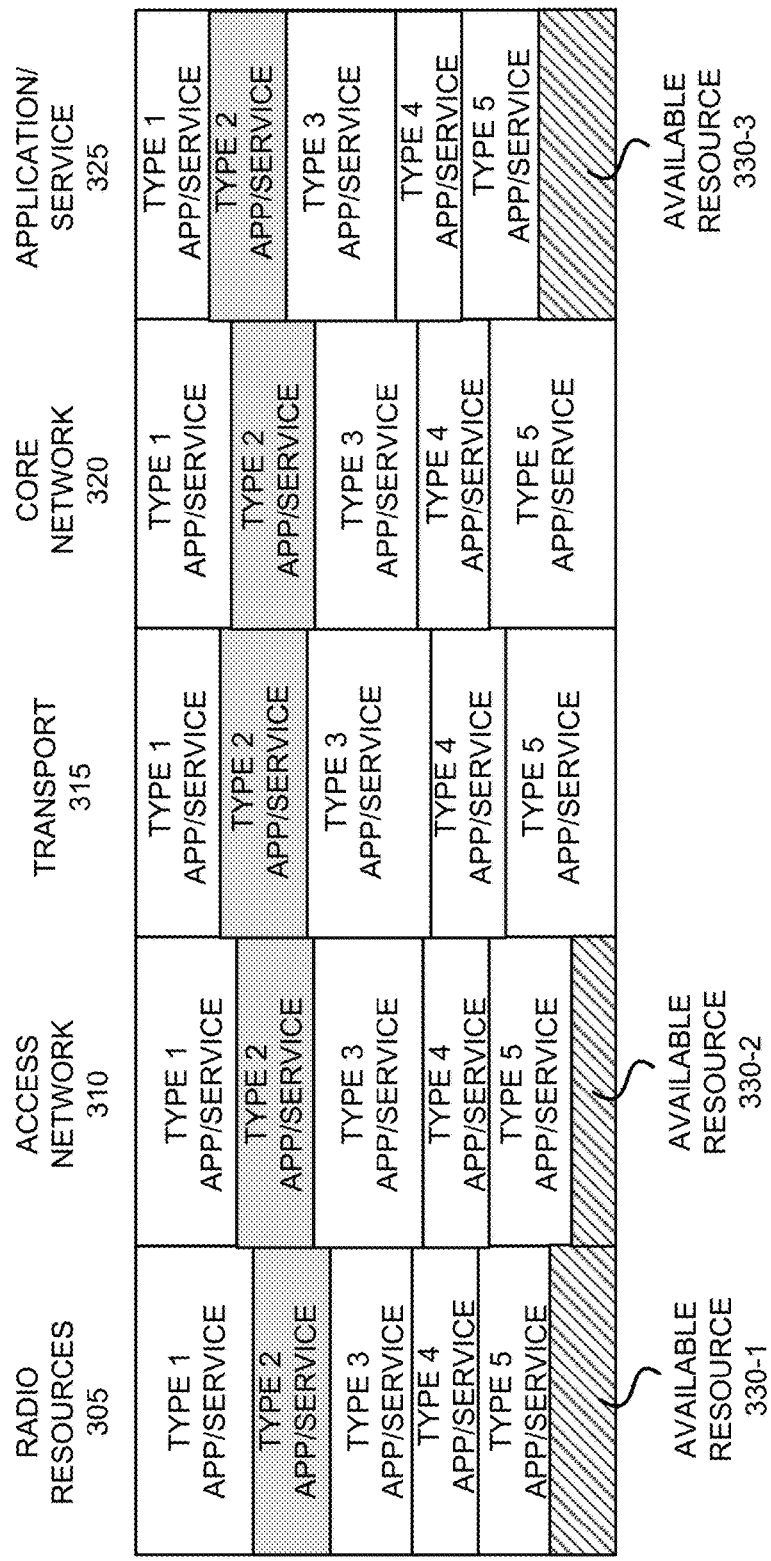
FIGS. 3B and 3C are diagrams illustrating an exemplary process of an exemplary embodiment of the end-to-end admission and congestion control service.
Figure 3C:
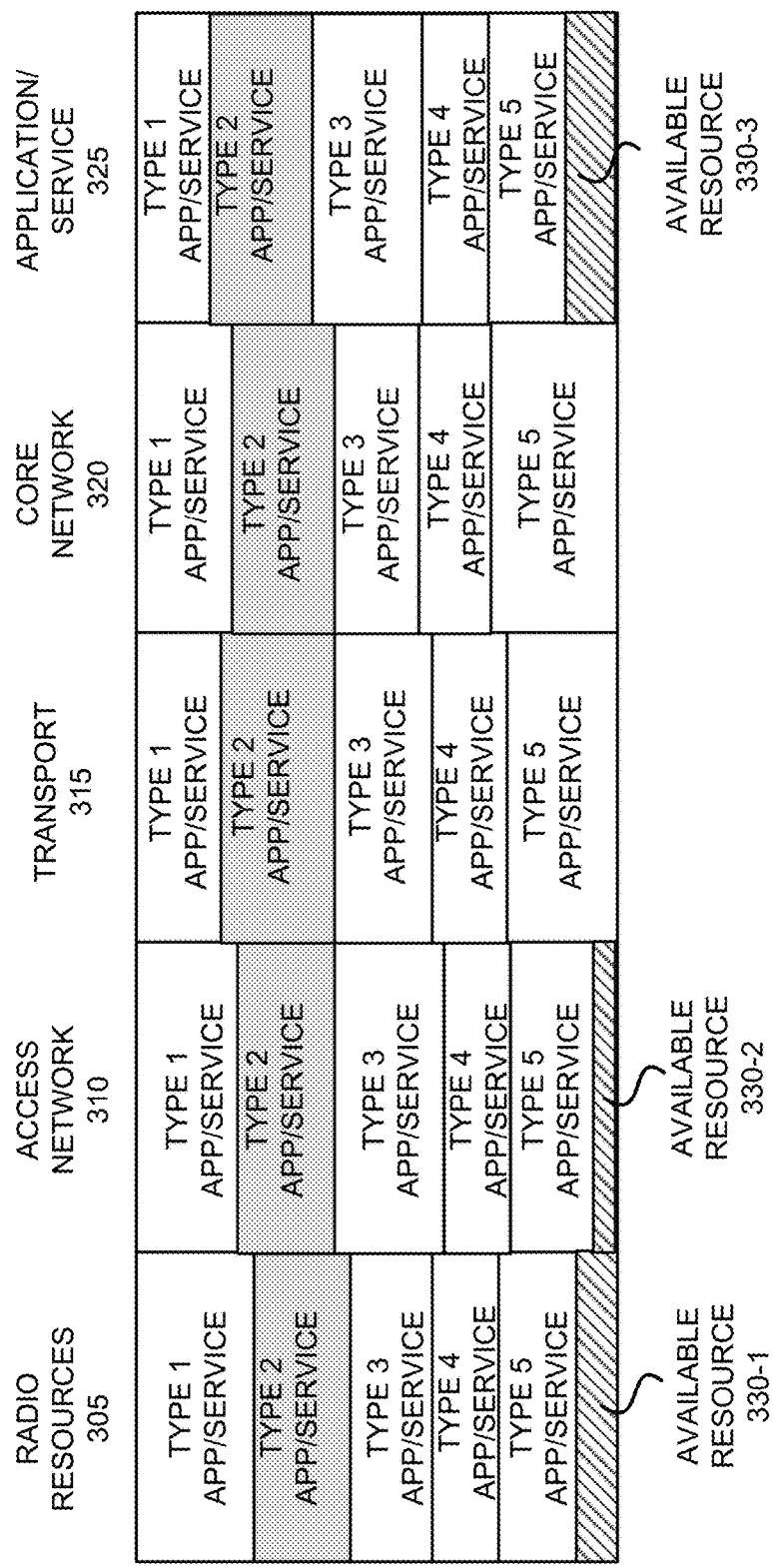

Referring to FIGS. 2D and 3A, according to an exemplary scenario, network slice management system 135 may determine that the network resource of the congested network slice may be increased. For example, referring to FIG. 3B, assume that the congested network supports a type 2 application/service. Referring to FIG. 3C, for radio resources portion 305, access network portion 310, and application/service portion 325, network slice management system 135 may increase the type 2 application/service using available resources 330. Additionally, for example, for transport portion 315 and core network portion 320, assume that network slice management system 135 determines that the type 3 application service is under-utilized. Thus, network slice management system 135 may increase the network resources of the congested network slice from end-to-end. Network slice management system 135 may generate and transmit network slice adjustment messages 262 to a network device of access network 105, core network 115, and network 120 (not illustrated) to effect the increase. For example, the network device may be implemented as a service orchestrator, a slice orchestrator, or other network device that configures the network resources of a network slice, as previously described.

Additionally, network slice management system 135 may generate and transmit a response 259, which indicates that the end-to-end resources of the network slice are increased, to admission and congestion control system 130. According to such an exemplary scenario, admission and congestion control system 130 may wait for additional state information or congestion information from UPF 215 and determine whether further remedial measures are to be taken.

However, if network slice management system 135 determines that the end-to-end resources of the network slice cannot be increased, response 259 may indicate that the resources have not been increased. With this assumption in mind, referring to FIG. 2E, in response to receiving response 259, which indicates that the resources cannot be increased, admission and congestion control system 130 invokes slice-based access control barring 264. For example, admission and congestion control system 130 generates and transmits an access control barring message 266 to network devices (e.g., gNB 205 and eLTE eNB 207) of the congested network slice in access network 105. The access control barring message may include an identifier of the congested network slice. According to various exemplary embodiments, the access control barring message may or may not include parameters and values that govern the access and control barring (e.g., percentage of end devices to bar, application/service to bar, time period to bar, etc.). The network devices may include logic to perform the network slice-based access control barring in response to receiving the access control barring message 266.

Figure 2F:
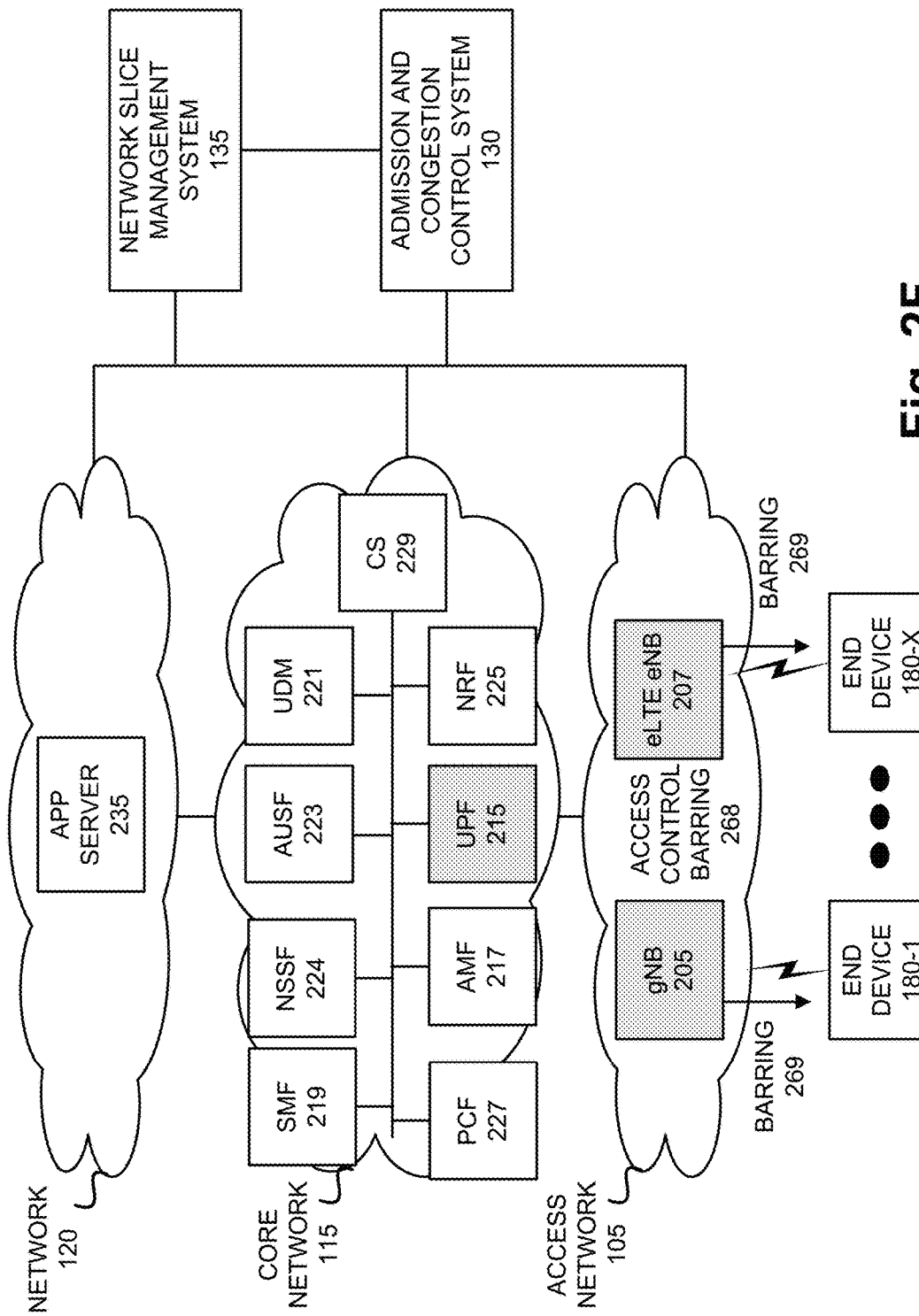

As illustrated in FIG. 2F, the network devices of access network 105 may perform an access control barring procedure 268. According to an exemplary embodiment, the network devices of the network slice may bar a percentage of end devices 180 (e.g., X %) and/or bar a percentage of an application/service (e.g., W %) for a particular time period (e.g., Y period). For example, the network devices may randomly select 15% of all end devices 180 that are using the network slice. Additionally, or alternatively, the network devices of access network 105 may first select a lower priority application/service supported by the network slice when the congested network slice supports multiple applications/services of varying priority levels. The network devices of access network 105 may generate and transmit a barring message to the selected end devices 180. As an example, gNB 205 and eLTE eNB 207 may transmit a barring message 269, which may bar a certain percentage of end devices 180 and application/service for a particular time period. In response to receiving the barring message, the certain percentage of end devices 180 may start a back-off in which service requests associated with an application/service are barred and not transmitted to gNB 205 and eLTE eNB 207.

According to an exemplary embodiment, the network devices of access network 105 may continue the access control barring until admission and congestion control system 130 instructs the network devices to stop. During this time, the network devices of access network 105 may be configured to increase barring absent receiving instructions from admission and congestion control system 130. For example, the network devices may increase the percentage of end devices 180 to bar, bar additional applications/services associated with the network slice, increase the time period of barring, and so forth. The network devices of access network 105 may also select different sets of end devices 180 to bar so as to prevent continuously barring the same end devices 180. Additionally, or alternatively, for example, when the congested network slice supports multiple applications/services of equal priority, the network devices may ping-pong between them so as to distribute the barring evenly among the equally prioritized applications/services. Further, the increase of the barring may include adding an application/service of higher priority relative to a previous application/service of lower priority that was barred, and/or using a timer to count the number of service requests associated with an application/service during the barring and barring the application/service with the highest number of service requests.

There are numerous barring and congestion mechanisms that may be used for managing congestion in a network. For example, there are device-based mechanisms according to access class barring (ACB) and enhanced access barring (EAB), an application-based mechanism according to service specific access control (SSAC) (i.e., only multimedia telephony (MINITEL) applications), an application specific congestion control for data communication (ACDC) mechanism, and a user-activity-based mechanism that restricts unattended or background data traffic. These and other barring and congestion mechanisms may be defined by network administrators or under standards, such as 3GPP. According to various exemplary embodiments, one or multiple barring mechanisms may be performed by the network devices of a network slice in access network 105.

Figure 2G:
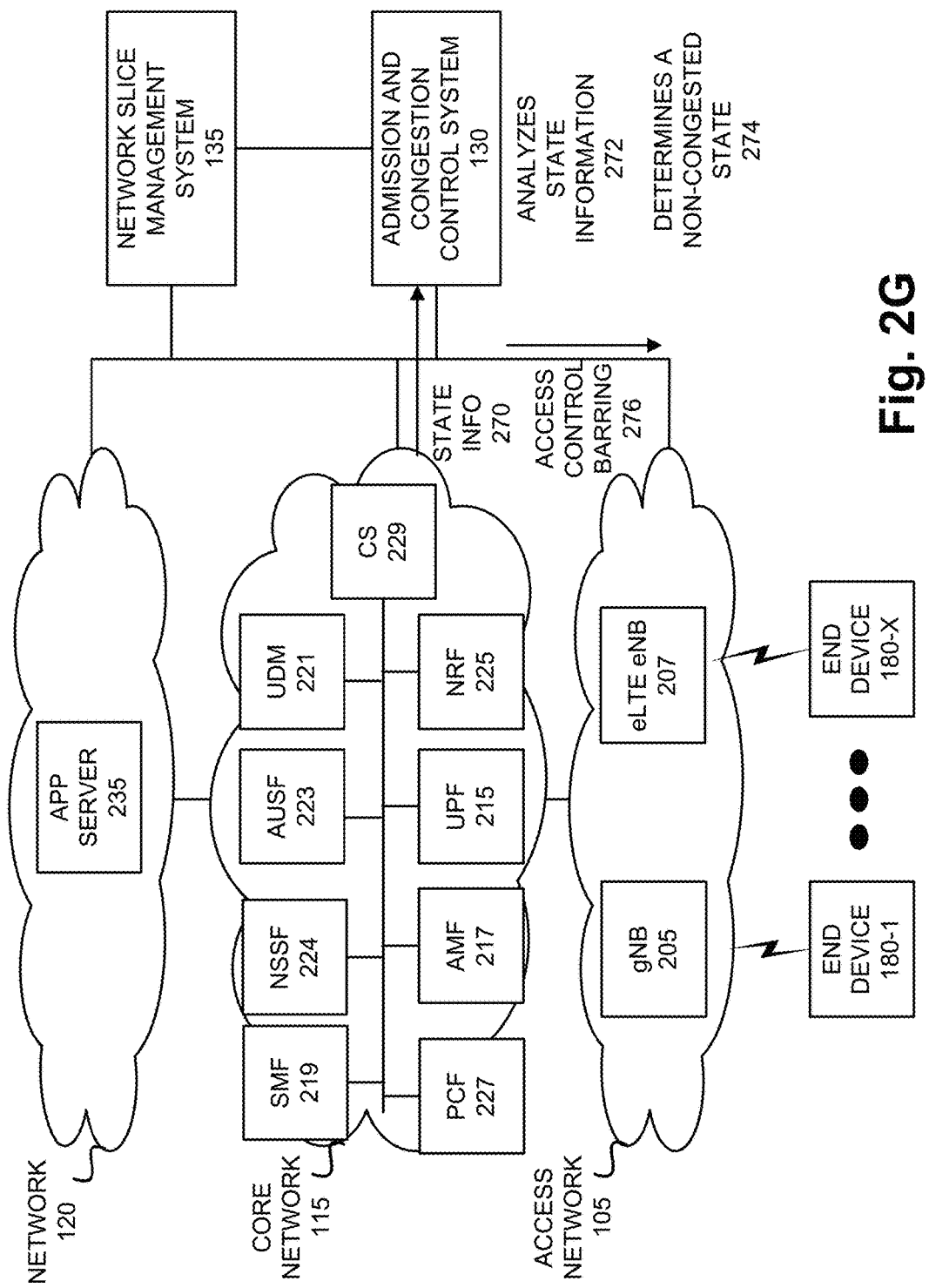

Referring to FIG. 2G, during the access control barring procedure, assume that UPF 215 continues to monitor its resource utilization pertaining to the network slice. Based on the monitoring, UPF 215 generates state information that includes parameters and values pertaining to one or multiple network resources (e.g., processor, memory, etc.). UPF 215 transmits the state information 270 to admission and congestion control system 130. In response to receiving the state information, admission and congestion control system 130 analyzes the state information 272. For example, admission and congestion control system 130 may compare the parameters and values to congestion parameters and values. Based on the comparison, admission and congestion control system 130 determines that UPF 215 is no longer in a congested state 274. Additionally, for example, admission and congestion control system 130 may determine that no other portion of the network slice is in a congested state. In response to this determination, admission and congestion control system 130 determines to terminate the access control barring procedure. For example, admission and congestion control system 130 may generate and transmit an access control barring message 276 to the network devices (e.g., gNB 205 and eLTE eNB 207) of the network slice in access network 105. In response to receiving the message, the network devices of the network slice may end the access control barring procedure.

Although FIGS. 2A-2G illustrate an exemplary process of the admission and congestion control service, according to other exemplary embodiments, the process may include additional, different, and/or fewer steps, include additional, different, and/or fewer messages, and/or involve additional, different, and/or fewer network devices. For example, the admission and congestion control service may determine whether the resource can be increased locally (e.g., at UPF of the network slice) and/or from end-to-end multiple times during the congested state of the network slice. For example, a determination that resources cannot be increased locally and, response to that determination, to determine whether resource may be increased from end-to-end, does not foreclose the admission and congestion control service to inquire again, either while a determination as to whether resources may be increased from end-to-end and/or during access control barring is being performed.

FIG. 4 is a diagram illustrating exemplary components of a device 400 that may be included in one or more of the devices described herein. For example, device 400 may correspond to components included in network devices of access network 105, network devices in core network 115, a network device in network 120, and end device 180. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to admission and congestion control system 130, software 420 may include an application that, when executed by processor 410, provides the functions of the admission and congestion control service, as described herein. Additionally, with reference to network slice management system 135, software 420 may include an application that, when executed by processor 410, provides the functions of the admission and congestion control system 130, as described herein. Further, with reference to network devices of access network 105, core network 115, and network 120, software 420 may include an application that, when executed by processor 410, provides the functions of the admission and congestion control service, as described herein. Software 420 may also include firmware, middleware, microcode, hardware description language (HDL), and/or other form of instruction. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
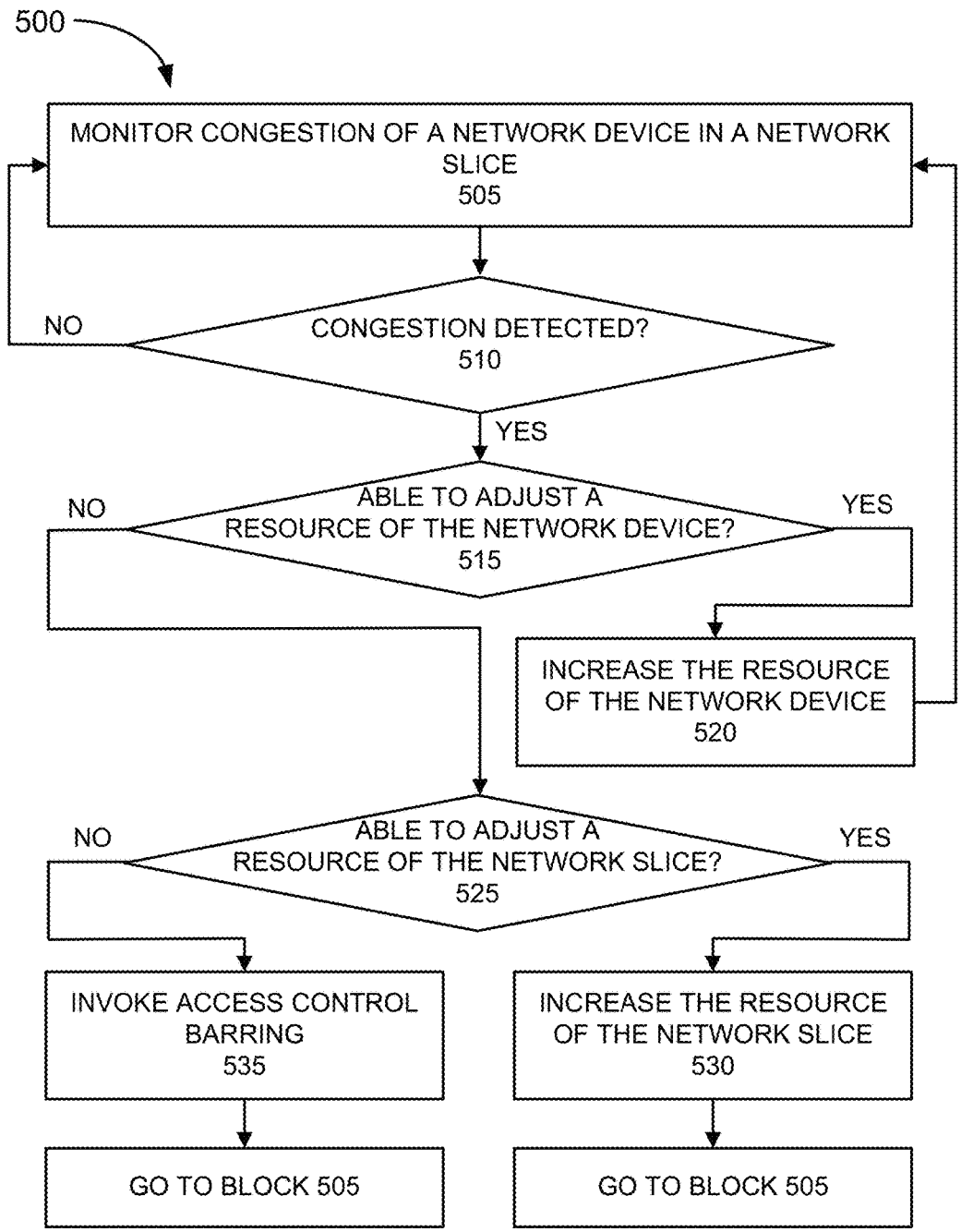
FIG. 5 is a flow diagram illustrating an exemplary process of an exemplary embodiment of the end-to-end admission and congestion control service.

FIG. 5 is a flow diagram illustrating an exemplary process 500 of an exemplary embodiment of the admission and congestion control service. According to an exemplary embodiment, admission and congestion control system 130 and network slice management system 135 performs steps of process 500. For example, processor 410 executes software 420 to perform the steps illustrated in FIG. 5, and described herein.

Referring to FIG. 5, in block 505, congestion of a network device in a network slice may be monitored. For example, admission and congestion control system 130 may obtain state information or congestion information from network devices of a network slice.

In block 510, it may be determined whether congestion is detected. For example, admission and congestion control system 130 may analyze the state information or congestion information and determine whether there is congestion. According to an exemplary implementation, admission and congestion control system 130 may compare the information to a congestion parameter and value. Based on a result of the comparison, admission and congestion control system 130 may determine whether congestion is detected. Additionally, for example, admission and congestion control system 130 may determine a degree of congestion (e.g., low, medium, high, etc.) in relation to the network resource (e.g., physical, virtual, logical).

When it is determined that no congestion is detected (block 510—NO), process 500 may return to block 505. For example, admission and congestion control system 130 continues to monitor for congestion in the network slice, as previously described.

When it is determined that congestion is detected (block 510—YES), it is determined whether a network resource of the network device can be adjusted (block 515). For example, admission and congestion control system 130 may determine whether a network resource of the network device of a network slice may be increased. According to an exemplary implementation, admission and congestion control system 130 may query network slice management system 135 and based on a result of a query, determine whether the network resource can be increased, as previously described.

When it is determined that the network resource of the network device can be adjusted (block 515—YES), the network resource of the network device is adjusted (block 525). For example, the network resource of the network device of the network slice may be increased. By way of further example, a physical network resource of UPF 215 (e.g., storage) may be increased, a logical network resource of UPF 215 (e.g., a partition of a processor may be increased), or a virtual resource of UPF 215 may be increased (e.g., adding another UPF to the network slice).

When it is determined that the network resource of the network device cannot be adjusted (block 515—NO), it is determined whether the end-to-end resource of the network slice can be adjusted (block 525). For example, admission and congestion control system 130 may determine whether an end-to-end resource (e.g., physical, logical, virtual) of the network slice may be increased. According to an exemplary implementation, admission and congestion control system 130 may query network slice management system 135 and based on a result of a query, determine whether the end-to-end resource can be increased, as previously described. For example, network slice management system 135 may determine whether there is an unused/reserved network resource that is not allocated to any network slice, whether there is an available network resource allocated to an under-utilized network slice, and/or whether a network slice of a priority class that is lower than the congested network slice may be used. According to an exemplary implementation, the network resource from a lower priority network slice may be used regardless whether or not the network resource is under-utilized in the lower priority network slice.

When it is determined that the end-to-end resource of the network slice can be adjusted (block 525—YES), the end-to-end resource of the network slice is adjusted (block 530). For example, network slice management system 135 may increase the network resource of the network slice from end-to-end, as previously described. For example, network slice management system 135 may increase end-to-end resources (e.g., physical, logical, virtual) of the network slice. By way of further example, the increase may include adding an additional network device to the network slice, increasing a percentage of use of a shared resource relative to another network slice/network device, and so forth. Process 500 may return to block 505. For example, admission and congestion control system 130 monitors for congestion, as previously described.

When it is determined that the end-to-end resource of the network slice cannot be adjusted (block 525—NO), an access control barring may be invoked (block 535). For example, admission and congestion control system 130 may invoke an access control barring procedure to be performed by a network device of the congested network slice residing in access network 105. Process 500 may return to block 505. For example, admission and congestion control system 130 monitors for congestion, as previously described.

Although FIG. 5 illustrates an exemplary process 500 of the admission and congestion control service, according to other embodiments, process 500 may include additional operations, fewer operations, and/or different operations than those illustrated in FIG. 5, and described herein. As described herein, process 500 may be iteratively performed until the congestion is under control. Additionally, for example, multiple measures to reduce congestion may be performed simultaneously (e.g., determining whether a resource of the network device can be increased, increasing the resource of the network device, invoking access control barring, etc.).

Figure 6:
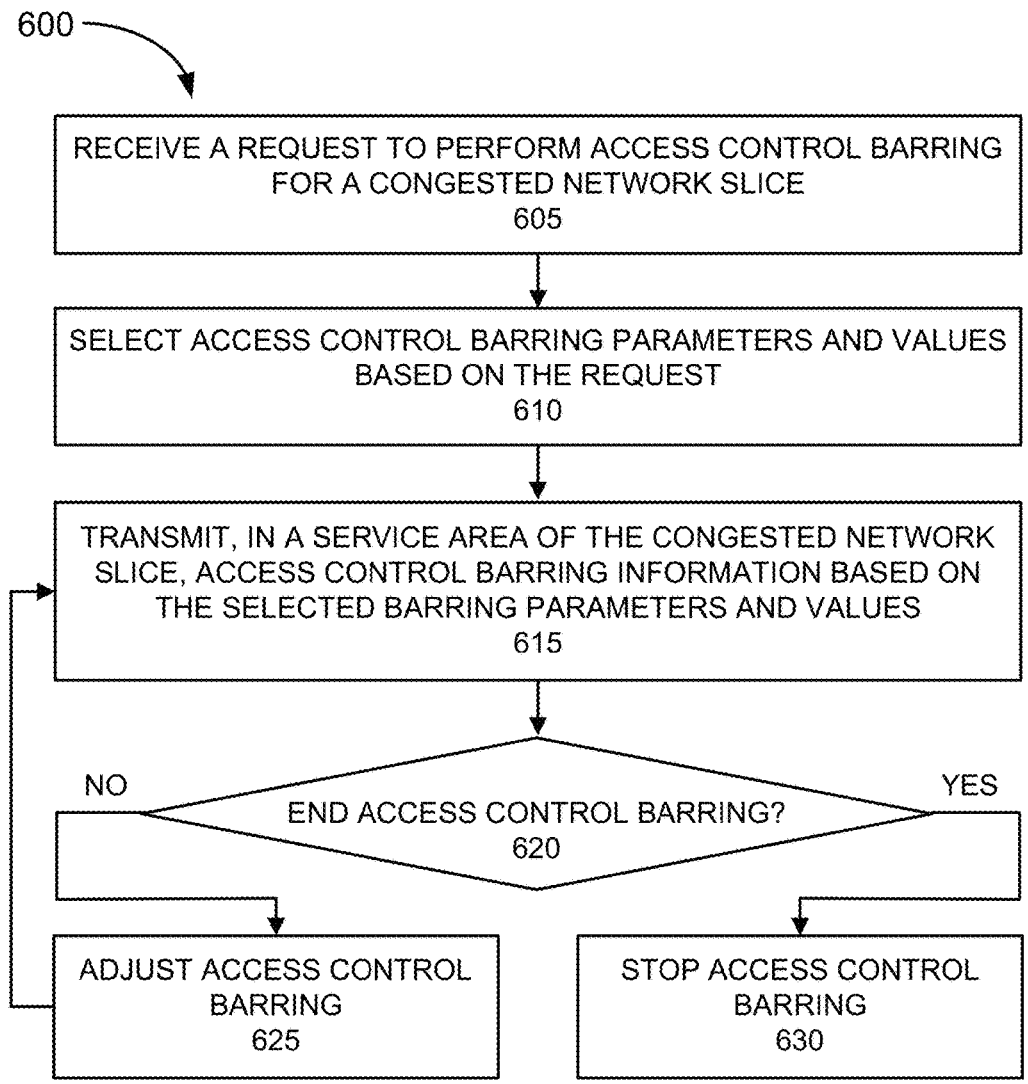
FIG. 6 is a flow diagram illustrating another exemplary process of an exemplary embodiment of the end-to-end admission and congestion control service.

FIG. 6 is a flow diagram illustrating an exemplary process 600 of an exemplary embodiment of the admission and congestion control service. According to an exemplary embodiment, a network device of access network 105 performs steps of process 600. For example, processor 410 executes software 420 to perform the steps illustrated in FIG. 6, and described herein. According to an exemplary embodiment, process 600 may be performed as a part of block 535 of process 500.

Referring to FIG. 6, in block 605, a request to perform access control barring for a congested network slice may be received. For example, admission and congestion control system 130 may generate and transmit a request to network device of access network 105 (e.g., gNB 205 and eLTE eNB 207) to perform access control barring. The request may include an identifier of the network slice. The request may include other information pertaining to the network slice (e.g., category of application/service, level of congestion of the network slice, the portion of the network slice that is congested (e.g., transport portion, core network portion, etc.), etc.) Subsequent to the transmission of the request, the network device may receive the request.

In block 610, access control barring parameters and values may be selected based on the request. For example, the network device may determine the barring mechanism to be used (e.g., ACB, EAB, etc.) and any parameters associated with the barring (e.g., percentage of end devices 180 to bar, the type of application/service to bar, the time period of the back-off period, etc.) in response to receiving the request, as described herein.

In block 615, access control barring information may be transmitted in a service area of the congested network slice based on the selected barring parameters and values. For example, the network device may generate and transmit a barring message to end devices 180 that reside in a cell serviced by the network device and use the network slice. The barring message may be implemented as a System Information Block (SIB) message or other type of control plane message.

In block 620, it is determined whether to end the access control barring. For example, the network device may determine whether to end the access control barring based on communication with admission and congestion control system 130. For example, when admission and congestion control system 130 determines that the congestion is ended, the network device may receive a message indicating to stop the access control barring. Additionally, for example, in the absence of receiving such a message, the network device may determine to continue with the access control barring.

According to other exemplary implementations, other mechanisms may be implemented. For example, when the congestion of the network slice stems from congestion only in the radio resource portion of the network slice, the network device (e.g., gNB 205, eLTE eNB 207) may determine whether the access control barring should end. According to such an implementation, the network device may determine whether congestion has been relieved and communicate the same to admission and congestion control system 130.

When it is determined that the access control barring is to not end (block 620—NO), the access control barring may be adjusted (block 625). For example, the network device may select parameters and values that increase the level of access control barring. Process 600 may continue to block 615.

When it is determined that the access control barring is to end (block 620—YES), the access control barring may end (block 630). For example, the network device may end the access control barring of the network slice.

Although FIG. 6 illustrates an exemplary process 600 of the admission and congestion control service, according to other embodiments, process 600 may include additional operations, fewer operations, and/or different operations than those illustrated in FIG. 6, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    monitoring, by a network device, congestion of a first network slice, wherein the first network slice includes network devices;
    determining, by the network device, whether congestion is detected for at least one of the network devices, based on the monitoring;
    determining, by the network device, whether a first network resource of the at least one of the network devices can be increased in response to determining that congestion is detected from the at least one of the network devices;
    determining, by the network device, whether a second network resource, from end-to-end of the first network slice, can be increased in response to determining that the first network resource of the at least one of the network devices cannot be increased, wherein determining whether the second resource, from end-to-end of the first network slice, can be increased comprises:
        identifying, by the network device, at least one of a third network resource of a second network slice that is under-utilized or that the second network slice is of a lower priority relative to a priority of the first network slice; and
    allocating, by the network device in response to the identifying, the third network resource of the second network slice to the first network slice.

2. The method of claim 1,
    wherein the first network resource is at least one of a physical resource, a logical resource, or a virtual resource.

3. The method of claim 1, further comprising:
    invoking, by the network device subsequent to the allocating, access control barring in the first network slice based on determining that congestion of the first network slice is detected.

4. The method of claim 3, further comprising:
    determining, by the network device and subsequent to the invoking, whether the congestion is ended in the first network slice; and
    ceasing, by the network device, the access control barring in response to determining that the congestion is ended.

5. The method of claim 1, further comprising:
    transmitting, by the network device to another network device, a message indicating to allocate the third network resource to the first network slice.

6. The method of claim 1, wherein the third network resource of the second network slice is not under-utilized.

7. The method of claim 1, wherein the monitoring comprises:
    receiving, by the network device from the at least one of the network devices, state information pertaining to resource utilization of the first network resource.

8. The method of claim 1,
    wherein the second network resource relates to at least one of an access network, a core network, or an application layer network.

9. A network device comprising:
    a communication interface;
    a memory, wherein the memory stores instructions; and
    a processor, wherein the processor executes the instructions to:
        monitor congestion of a first network slice, wherein the first network slice includes network devices;
        determine whether congestion is detected for at least one of the network devices, based on the monitoring;

determine whether a first network resource of the at least one of the network devices can be increased in response to a determination that congestion is detected from the at least one of the network devices;

determine whether a second network resource, from end-to-end of the first network slice, can be increased in response to a determination that the first network resource of the at least one of the network devices cannot be increased, wherein a determination whether the second network resource, from end-to-end of the first network slice, can be increased comprises:

identify at least one of a third network resource of a second network slice that is under-utilized or that the second network slice is of a lower priority relative to a priority of the first network slice; and allocate, in response to the identification, the third network resource of the second network slice to the first network slice.

10. The network device of claim 9, wherein the first network resource is at least one of a physical resource, a logical resource, or a virtual resource.

11. The network device of claim 9, wherein the processor further executes the instructions to:

invoke, subsequent to the allocation, access control barring in the first network slice based on a determination that congestion of the first network slice is detected.

12. The network device of claim 11, wherein the processor further executes the instructions to:

determine, subsequent to the invocation, whether the congestion is ended in the first network slice; and cease the access control barring in response to the determination that the congestion is ended.

13. The network device of claim 9, wherein the processor further executes the instructions to:

transmit, via the communication interface to another network device, a message indicating to allocate the third network resource to the first network slice.

14. The network device of claim 9, wherein the third network resource of the second network slice is not under-utilized.

15. The network device of claim 9, wherein the second network resource relates to at least one of an access network, a core network, or an application layer network.

16. A non-transitory, computer-readable storage medium storing instructions executable by a processor of a device, which when executed cause the device to:

monitor congestion of a first network slice, wherein the first network slice includes network devices;

determine whether congestion is detected for at least one of the network devices, based on the monitoring;

determine whether a first network resource of the at least one of the network devices can be increased in response to a determination that congestion is detected from the at least one of the network devices;

determine whether a second network resource, from end-to-end of the first network slice, can be increased in response to a determination that the first network resource of the at least one of the network devices cannot be increased, wherein a determination whether the second resource, from end-to-end of the first network slice, can be increased comprises:

identify at least one of a third network resource of a second network slice that is under-utilized or that the second network slice is of a lower priority relative to a priority of the first network slice; and allocate, in response to the identification, the third network resource of the second network slice to the first network slice.

17. The non-transitory, computer-readable storage medium of claim 16, wherein the first network resource is at least one of a physical resource, a logical resource, or a virtual resource.

18. The non-transitory, computer-readable storage medium of claim 17, wherein the second network resource relates to at least one of an access network, a core network, or an application layer network.

19. The non-transitory, computer-readable storage medium of claim 16, wherein the instructions further include instructions executable by the processor of the device, which when executed cause the device to:

invoke, subsequent to the allocation, access control barring in the first network slice based on a determination that congestion of the first network slice is detected.

20. The non-transitory, computer-readable storage medium of claim 19, wherein the instructions further include instructions executable by the processor of the device, which when executed cause the device to:

determine, subsequent to the invocation of the access control barring, whether the congestion is ended in the first network slice; and cease the access control barring in response to a determination that the congestion is ended.

* * * * *